US010071545B2

(12) United States Patent
Harrison et al.

(10) Patent No.: US 10,071,545 B2
(45) Date of Patent: Sep. 11, 2018

(54) SYSTEMS FOR ADDITIVELY MANUFACTURING COMPOSITE PARTS

(71) Applicant: The Boeing Company, Chicago, IL (US)

(72) Inventors: Samuel F. Harrison, Bothell, WA (US);
Faraón Torres, Seattle, WA (US);
Ryan G. Ziegler, Mill Creek, WA (US);
Nick S. Evans, Lynnwood, WA (US);
Ciro J. Grijalva, III, Seattle, WA (US);
Hayden S. Osborn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 61 days.

(21) Appl. No.: 15/087,882

(22) Filed: Mar. 31, 2016

(65) Prior Publication Data

US 2017/0028640 A1 Feb. 2, 2017

Related U.S. Application Data

(60) Provisional application No. 62/199,665, filed on Jul. 31, 2015.

(51) Int. Cl.
*B29C 64/20* (2017.01)
*B33Y 70/00* (2015.01)
(Continued)

(52) U.S. Cl.
CPC .............. *B33Y 70/00* (2014.12); *B05D 1/265* (2013.01); *B05D 1/34* (2013.01); *B05D 3/06* (2013.01);
(Continued)

(58) Field of Classification Search
CPC ........................... B29C 64/20; B29C 47/0002
See application file for complete search history.

(56) References Cited

U.S. PATENT DOCUMENTS

| 3,600,272 A | 8/1971 | Cortigene et al. |
| 3,813,976 A | 6/1974 | Greer |

(Continued)

FOREIGN PATENT DOCUMENTS

| CN | 103817937 A | * | 5/2014 | ............ B29C 67/00 |
| CN | 205130397 U | * | 4/2016 | ............ B29C 67/00 |

(Continued)

OTHER PUBLICATIONS

Ogale et al., "Fabrication of Fiber Reinforced Plates with Curvilinear Layout by 3-D Photolithography," 26th International SAMPE Technical Conference, vol. 26, pp. 54-61, Oct. 17-20, 1994.

(Continued)

*Primary Examiner* — Galen H Hauth
*Assistant Examiner* — Cedrick S Williams
(74) *Attorney, Agent, or Firm* — DASCENZO Intellectual Property Law, P.C.

(57) ABSTRACT

A system for additively manufacturing a composite part is disclosed. The system comprises a housing and a nozzle. The nozzle is supported by the housing. The nozzle comprises an outlet, sized to dispense a continuous flexible line. The continuous flexible line comprises a non-resin component and a photopolymer-resin component. The system also comprises a feed mechanism, supported within the housing. The feed mechanism is configured to push the continuous flexible line out of the outlet of the nozzle. The system further comprises a light source, supported by the housing. The light source is configured to deliver a light beam to the continuous flexible line after the continuous flexible line exits the outlet of the nozzle to at least partially cure the photopolymer-resin component of the continuous flexible line.

35 Claims, 8 Drawing Sheets

(51) Int. Cl.

| | | |
|---|---|---|
| *B29C 69/00* | (2006.01) | |
| *B29C 70/28* | (2006.01) | |
| *B05D 1/26* | (2006.01) | |
| *B05D 1/34* | (2006.01) | |
| *B05D 3/06* | (2006.01) | |
| *B05D 3/12* | (2006.01) | |
| *B29C 35/16* | (2006.01) | |
| *B29C 70/16* | (2006.01) | |
| *B29C 70/38* | (2006.01) | |
| *B29C 70/54* | (2006.01) | |
| *C09D 5/00* | (2006.01) | |
| *B29B 11/00* | (2006.01) | |
| *B29B 11/16* | (2006.01) | |
| *C09D 201/00* | (2006.01) | |
| *B29C 47/00* | (2006.01) | |
| *B29C 64/00* | (2017.01) | |
| *B29C 64/106* | (2017.01) | |
| *B29C 64/135* | (2017.01) | |
| *B29C 64/129* | (2017.01) | |
| *B29C 64/165* | (2017.01) | |
| *B29C 64/386* | (2017.01) | |
| *B29C 64/40* | (2017.01) | |
| *B29K 105/00* | (2006.01) | |
| *B33Y 10/00* | (2015.01) | |
| *B29L 31/30* | (2006.01) | |
| *B29L 31/00* | (2006.01) | |
| *B33Y 30/00* | (2015.01) | |
| *B33Y 40/00* | (2015.01) | |
| *B29K 63/00* | (2006.01) | |
| *B29K 105/08* | (2006.01) | |
| *B29K 105/10* | (2006.01) | |
| *B33Y 50/02* | (2015.01) | |
| *B29K 101/10* | (2006.01) | |
| *B29K 105/12* | (2006.01) | |
| *B29C 35/08* | (2006.01) | |
| *B29K 105/06* | (2006.01) | |

(52) U.S. Cl.
CPC .......... *B05D 3/067* (2013.01); *B05D 3/068* (2013.01); *B05D 3/12* (2013.01); *B29B 11/00* (2013.01); *B29B 11/16* (2013.01); *B29C 35/16* (2013.01); *B29C 47/0002* (2013.01); *B29C 64/00* (2017.08); *B29C 64/106* (2017.08); *B29C 64/129* (2017.08); *B29C 64/135* (2017.08); *B29C 64/165* (2017.08); *B29C 64/20* (2017.08); *B29C 64/386* (2017.08); *B29C 64/40* (2017.08); *B29C 69/001* (2013.01); *B29C 70/16* (2013.01); *B29C 70/28* (2013.01); *B29C 70/38* (2013.01); *B29C 70/545* (2013.01); *C09D 5/00* (2013.01); *C09D 201/00* (2013.01); *B29C 35/0805* (2013.01); *B29C 2035/0822* (2013.01); *B29C 2035/0827* (2013.01); *B29C 2035/0833* (2013.01); *B29C 2035/0838* (2013.01); *B29C 2035/0844* (2013.01); *B29K 2063/00* (2013.01); *B29K 2101/10* (2013.01); *B29K 2105/0058* (2013.01); *B29K 2105/06* (2013.01); *B29K 2105/0872* (2013.01); *B29K 2105/10* (2013.01); *B29K 2105/101* (2013.01); *B29K 2105/12* (2013.01); *B29K 2105/25* (2013.01); *B29K 2105/253* (2013.01); *B29K 2995/005* (2013.01); *B29L 2031/00* (2013.01); *B29L 2031/3076* (2013.01); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 4,154,634 A | 5/1979 | Shobert et al. | |
| 4,378,343 A | 3/1983 | Sugiura et al. | |
| 4,435,246 A | 3/1984 | Green | |
| 4,943,472 A | 7/1990 | Dyksterhouse et al. | |
| 5,204,124 A | 4/1993 | Secretan et al. | |
| 5,294,461 A | 3/1994 | Ishida | |
| 5,340,433 A | 8/1994 | Crump | |
| 5,398,193 A | 3/1995 | deAngelis | |
| 5,495,328 A | 2/1996 | Spence et al. | |
| 5,936,861 A | 8/1999 | Jang et al. | |
| 6,129,872 A * | 10/2000 | Jang ................. B29C 41/36 | |
| | | | 264/245 |
| 6,149,856 A | 11/2000 | Zemel et al. | |
| 6,214,279 B1 | 4/2001 | Yang et al. | |
| 6,722,872 B1 | 4/2004 | Swanson et al. | |
| 7,114,943 B1 | 10/2006 | Fong et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,149,989 B2 | 10/2015 | Uckelmann | |
| 2003/0044593 A1 | 3/2003 | Vaidyanathan et al. | |
| 2004/0119188 A1 | 6/2004 | Lowe | |
| 2005/0023719 A1 | 2/2005 | Nielsen et al. | |
| 2005/0038222 A1 | 2/2005 | Joshi et al. | |
| 2005/0104241 A1 | 5/2005 | Kritchman et al. | |
| 2005/0116391 A1 | 6/2005 | Lindemann et al. | |
| 2005/0248065 A1 | 11/2005 | Owada | |
| 2007/0029030 A1 | 2/2007 | McCowin | |
| 2008/0213419 A1 | 9/2008 | Skubic et al. | |
| 2008/0315462 A1 | 12/2008 | Batzinger et al. | |
| 2009/0095410 A1 | 4/2009 | Oldani | |
| 2009/0130449 A1 | 5/2009 | El-Siblani | |
| 2009/0314391 A1 | 12/2009 | Crump et al. | |
| 2010/0024964 A1 | 2/2010 | Ingram, Jr. et al. | |
| 2010/0084087 A1* | 4/2010 | McCowin ............ B29C 70/386 | |
| | | | 156/267 |
| 2010/0190005 A1 | 7/2010 | Nair et al. | |
| 2011/0147993 A1 | 6/2011 | Eshed et al. | |
| 2011/0300301 A1 | 12/2011 | Fernando et al. | |
| 2014/0061974 A1* | 3/2014 | Tyler ................. B29C 67/0055 | |
| | | | 264/401 |
| 2014/0154347 A1* | 6/2014 | Dilworth ............ B29C 47/0002 | |
| | | | 425/87 |
| 2014/0263534 A1 | 9/2014 | Post et al. | |
| 2014/0265040 A1 | 9/2014 | Batchelder | |
| 2014/0291886 A1* | 10/2014 | Mark .................... B29C 47/025 | |
| | | | 264/163 |
| 2014/0328964 A1 | 11/2014 | Mark et al. | |
| 2014/0375794 A1 | 12/2014 | Singh | |
| 2015/0008422 A1 | 1/2015 | Lee et al. | |
| 2015/0037599 A1 | 2/2015 | Blackmore | |
| 2015/0044377 A1 | 2/2015 | Tibor et al. | |
| 2015/0048553 A1* | 2/2015 | Dietrich ................ B22F 3/1055 | |
| | | | 264/401 |
| 2015/0140230 A1* | 5/2015 | Jones ................... B23P 23/04 | |
| | | | 427/532 |
| 2015/0174824 A1 | 6/2015 | Gifford et al. | |
| 2015/0217517 A1 | 8/2015 | Karpas et al. | |
| 2015/0291833 A1 | 10/2015 | Kunc et al. | |
| 2016/0136897 A1* | 5/2016 | Nielsen-Cole ......... B33Y 30/00 | |
| | | | 425/131.1 |
| 2016/0159009 A1 | 6/2016 | Canale | |
| 2016/0303793 A1 | 10/2016 | Ermoshkin et al. | |
| 2017/0129180 A1* | 5/2017 | Coates ................. B29C 67/0085 | |

FOREIGN PATENT DOCUMENTS

| | | |
|---|---|---|
| DE | 201310103973 | 10/2014 |
| WO | WO 2006/020685 | 2/2006 |
| WO | WO 2012/039956 | 3/2012 |
| WO | WO 2013/086577 | 6/2013 |
| WO | WO 2014/153535 | 9/2014 |
| WO | WO 2015/009938 | 1/2015 |

(56) References Cited

FOREIGN PATENT DOCUMENTS

| WO | WO 2016/053681 | 4/2016 |
|---|---|---|
| WO | WO 2016125138 | 8/2016 |
| WO | WO 2016139059 | 9/2016 |

OTHER PUBLICATIONS

Ogale et al., "3-Dimensional Composite Photolithography," Proceedings of the American Society for Composites, Eleventh Technical Conference, pp. 822-828, Oct. 7-9, 1996.

Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.

Gupta et al., "Dual Curing of Carbon Fiber Reinforced Photoresins for Rapid Prototyping," Polymer Composites, vol. 23, No. 6, pp. 1162-1170, Dec. 2002.

Website screenshots showing "Fiber Composite 3D Printing," downloaded from makezine.com/2014/11/05/fiber-composite-3d-printing/, Jun. 2, 2015.

User Manual for 3Doodler 2.0, downloaded from the3doodler.com/manuals/, Aug. 19, 2015.

Website article "Automated Fiber Placement," downloaded from automateddynamics.com/article/thermoplastic-composite-basics/processing-methods/automated-fiber-placement, Aug. 19, 2015.

Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, downloaded from sciencedirect.com/science/article/pii/S0010448510001788, Aug. 19, 2015.

Website screenshots showing The Mark One Composite 3D Printer, downloaded from markforged.com/mark-one/, Aug. 19, 2015.

Website article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.

Website screenshots showing Krassenstein "Orbital Composites to Make 3D Printing 100 Times Faster Using Carbon Fiber, Fiber Optics, Injection & More," Apr. 28, 2015, downloaded from 3dprint.com/60662/orbital-composites/, Aug. 19, 2015.

Website article "Carbon3D Introduces Breakthrough CLIP Technology for Layerless 3D Printing, 25-100x Faster," Mar. 17, 2015, downloaded from 3ders.org/articles/20150317-carbon3d-introduces-breakthrough-clip-technology-for-layerless-3d-printing.html, Aug. 19, 2015.

Website screenshots showing The Form 1+ SLA 3D Printer, downloaded from formlabs.com/products/form-1-plus/, Aug. 20, 2015.

Formlabs, Frequently Asked Questions (re the Form1+ SLA 3D Printer), downloaded from formlabs.com/support/faq/, Aug. 19, 2015.

Website screenshots showing "Fiber Composite 3D Printing (The Bug)," downloaded from instructables.com/id/Fiber-Composite-3D-Printing-The-Bug/?ALLSTEPS, Aug. 20, 2015.

Screenshots of online article, Evan Milberg, "Arevo Labs Introduces First Robot-Based Platform for 3-D Printing Composite Parts," Composites Manufacturing Magazine website, Nov. 23, 2015, downloaded from compositesmanufacturingmagazine.com/2015/11/arevo-labs-introduces-first-robot-based-platform-for-3-d-printing-composite-parts/ on Jan. 12, 2016.

Printout of online article, Jeff Sloan, "Arevo Labs launches 3D printing platform for composite parts fabrication," CompositesWorld website, Nov. 16, 2015, downloaded from compositesworld.com/products/arevo-labs- launches-3D-printing-platform-for-composite-parts-fabrication on Dec. 9, 2015.

Printout of online article, "Improving Additive Manufacturing (3D Printing) using Infrared Imaging," Aug. 10, 2016, from AZoM.com website, downloaded on Nov. 4, 2016.

Website screenshots showing Stratonics ThermaViz® Sensor Systems, from Stratonics.com website, downloaded on Nov. 4, 2016.

Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.

Hu et al., "Sensing, Modeling and Control for Laser-Based Additive Manufacturing," International Journal of Machine Tools and Manufacture, No. 43, pp. 51-60, 2003.

Machine generated English translation of abstract for DE 201310103973 downloaded from Espacenet.com on Nov. 1, 2017.

* cited by examiner

SYSTEMS FOR ADDITIVELY MANUFACTURING COMPOSITE PARTS

RELATED APPLICATION

This application claims priority to U.S. Provisional Patent Application No. 62/199,665, entitled "SYSTEMS AND METHODS FOR ADDITIVELY MANUFACTURING COMPOSITE PARTS," which was filed on Jul. 31, 2015, and the complete disclosure of which is hereby incorporated by reference.

BACKGROUND

Conventionally, manufacturing of typical composite parts relies on sequential layering of multiple plies of composite material, with each ply containing, e.g., unidirectional reinforcement fibers or randomly oriented chopped fibers. Parts manufactured in this manner must have laminar construction, which undesirably increases the weight of the finished part, since not all of the reinforcement fibers are oriented along the direction(s) of the force(s) to be applied to the parts. Additionally, limitations inherent to laminar techniques of manufacturing composites are not conducive to implementation of many types of advanced structural designs.

SUMMARY

Accordingly, apparatuses intended to address at least the above-identified concerns, would find utility.

The following is a non-exhaustive list of examples, which may or may not be claimed, of the subject matter according the present disclosure.

One example of the present disclosure relates to a system for additively manufacturing a composite part. The system comprises a housing and a nozzle. The nozzle is supported by the housing. The nozzle comprises an outlet, sized to dispense a continuous flexible line. The continuous flexible line comprises a non-resin component and a photopolymer-resin component. The system also comprises a feed mechanism, supported within the housing. The feed mechanism is configured to push the continuous flexible line out of the outlet of the nozzle. The system further comprises a light source, supported by the housing. The light source is configured to deliver a light beam to the continuous flexible line after the continuous flexible line exits the outlet of the nozzle to at least partially cure the photopolymer-resin component of the continuous flexible line.

BRIEF DESCRIPTION OF THE DRAWINGS

Figure 1:
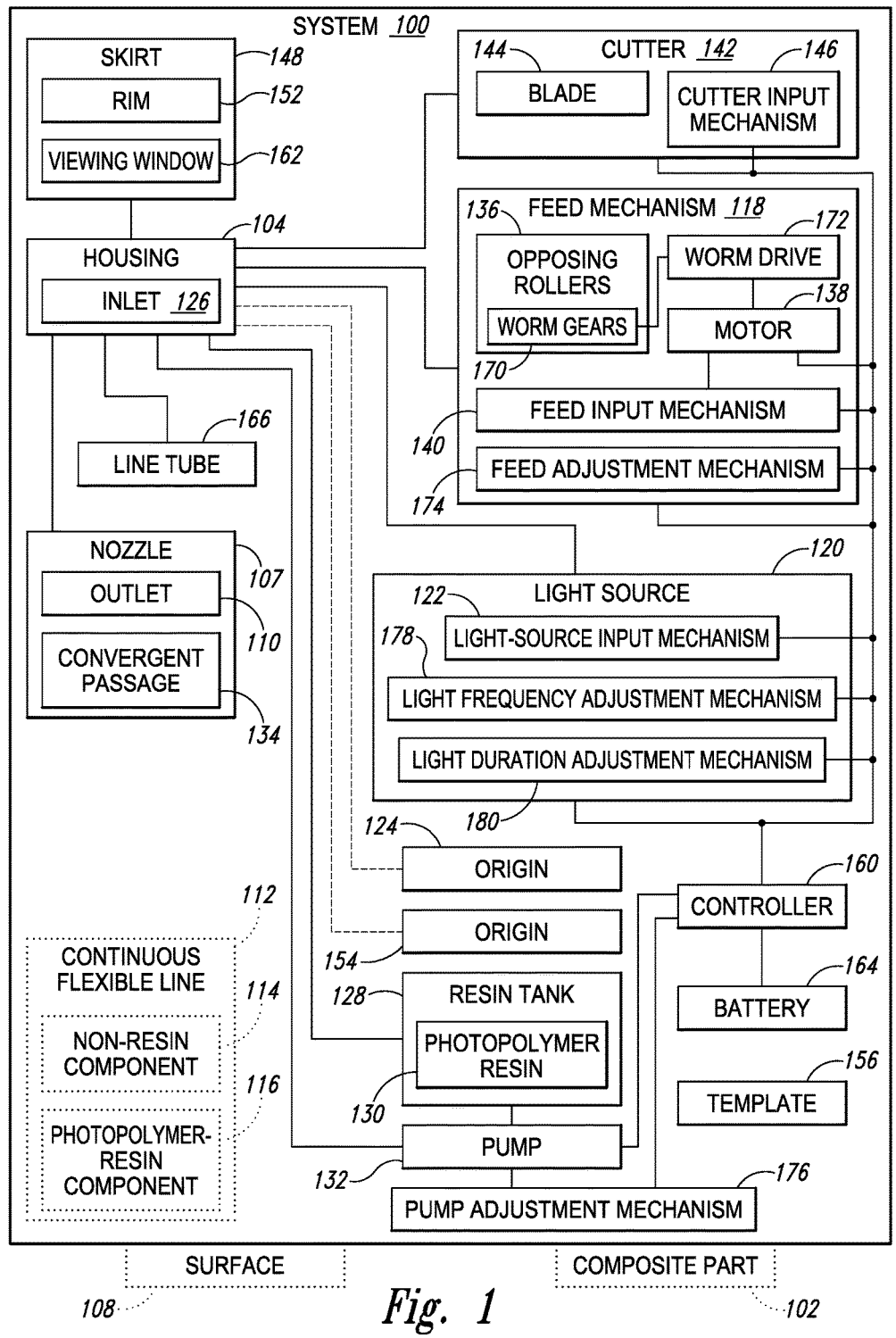
Figure 2:
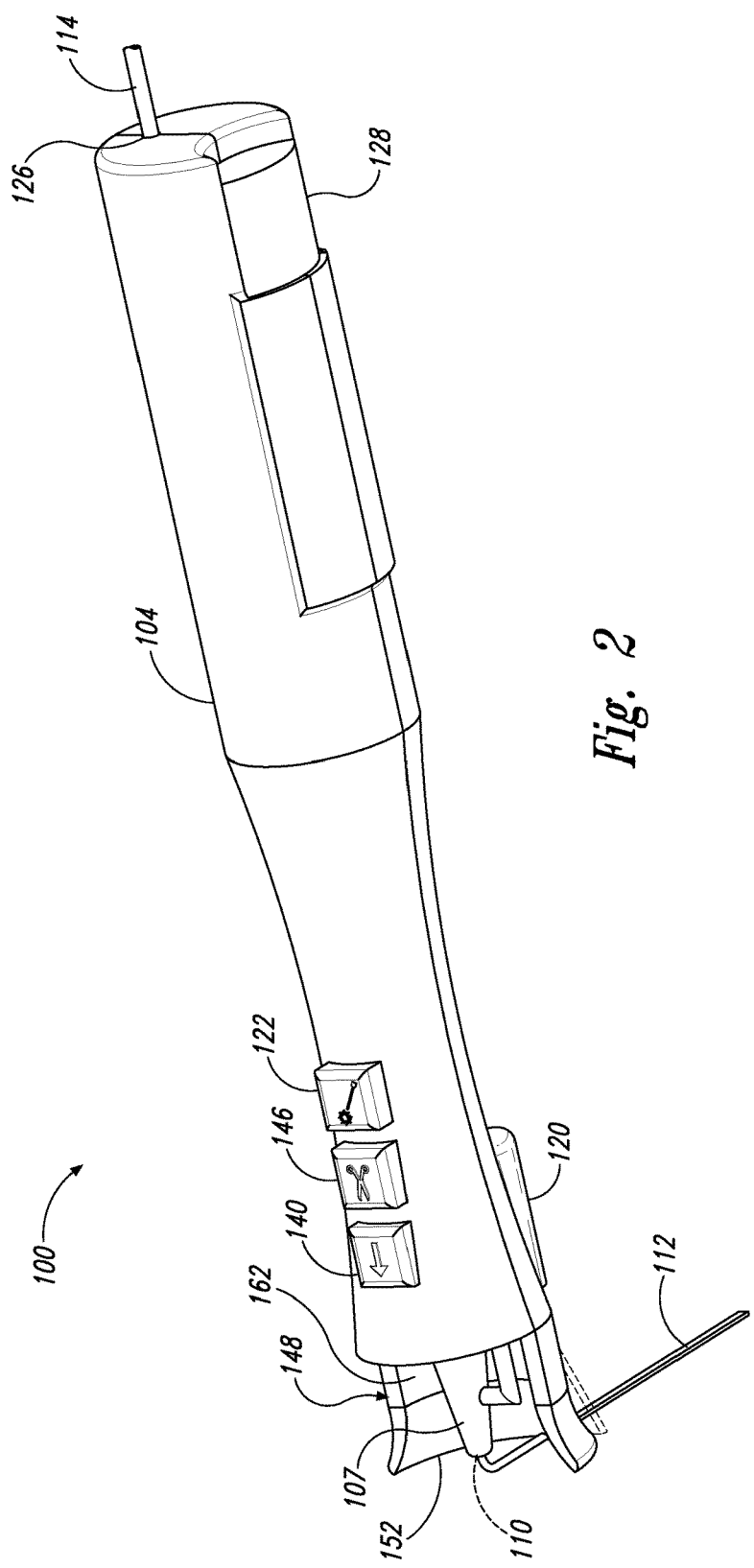
Figure 3:
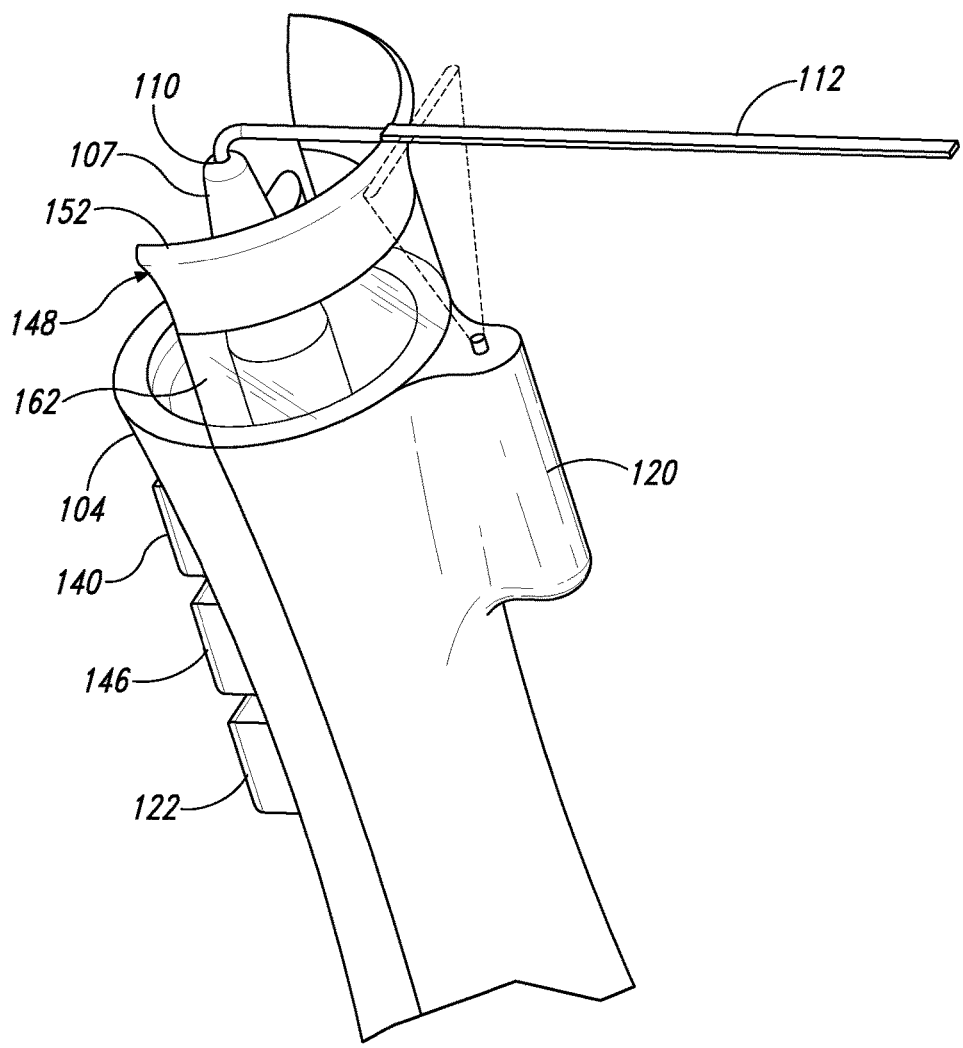
Figure 4:
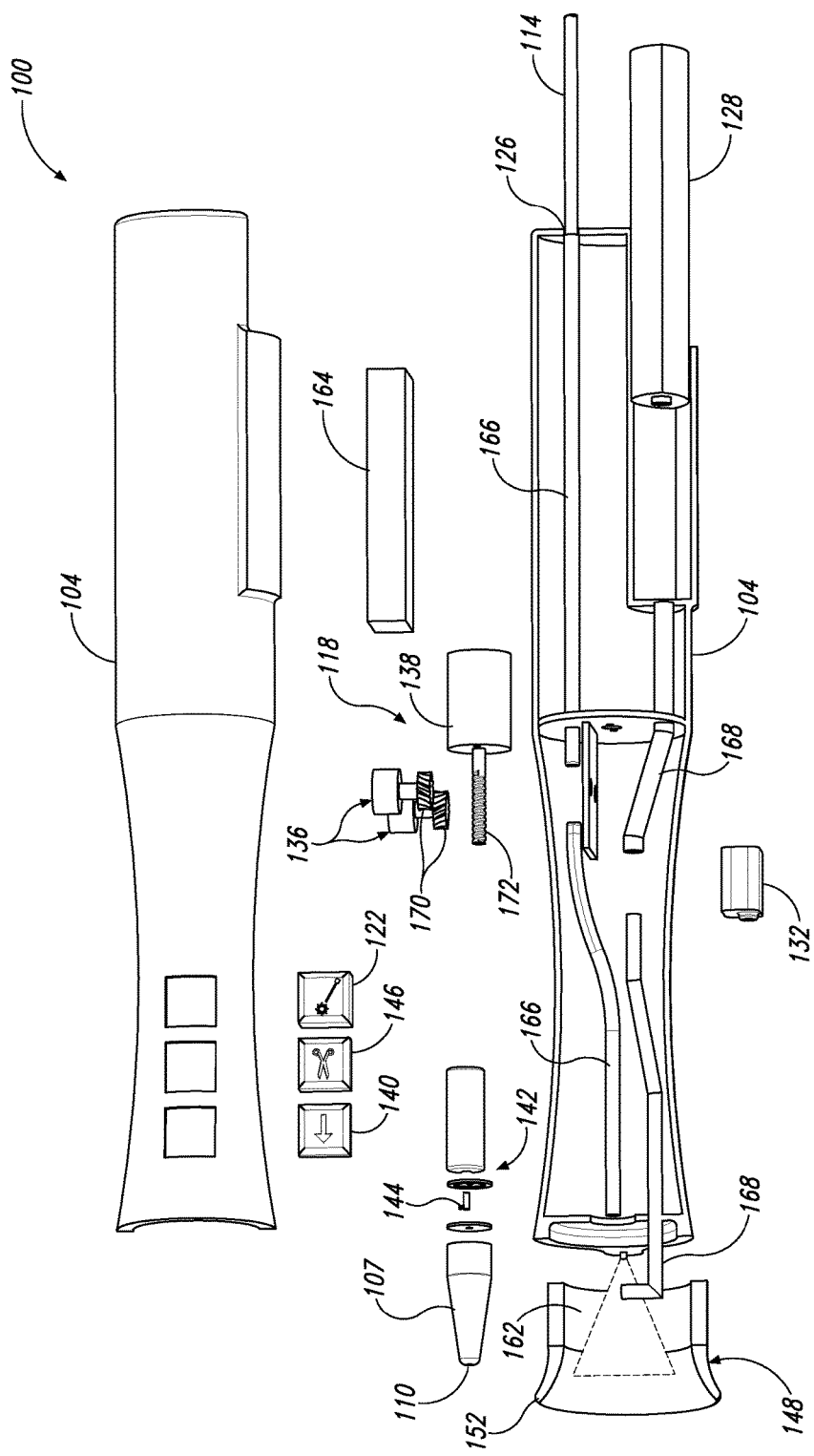
Figure 5:
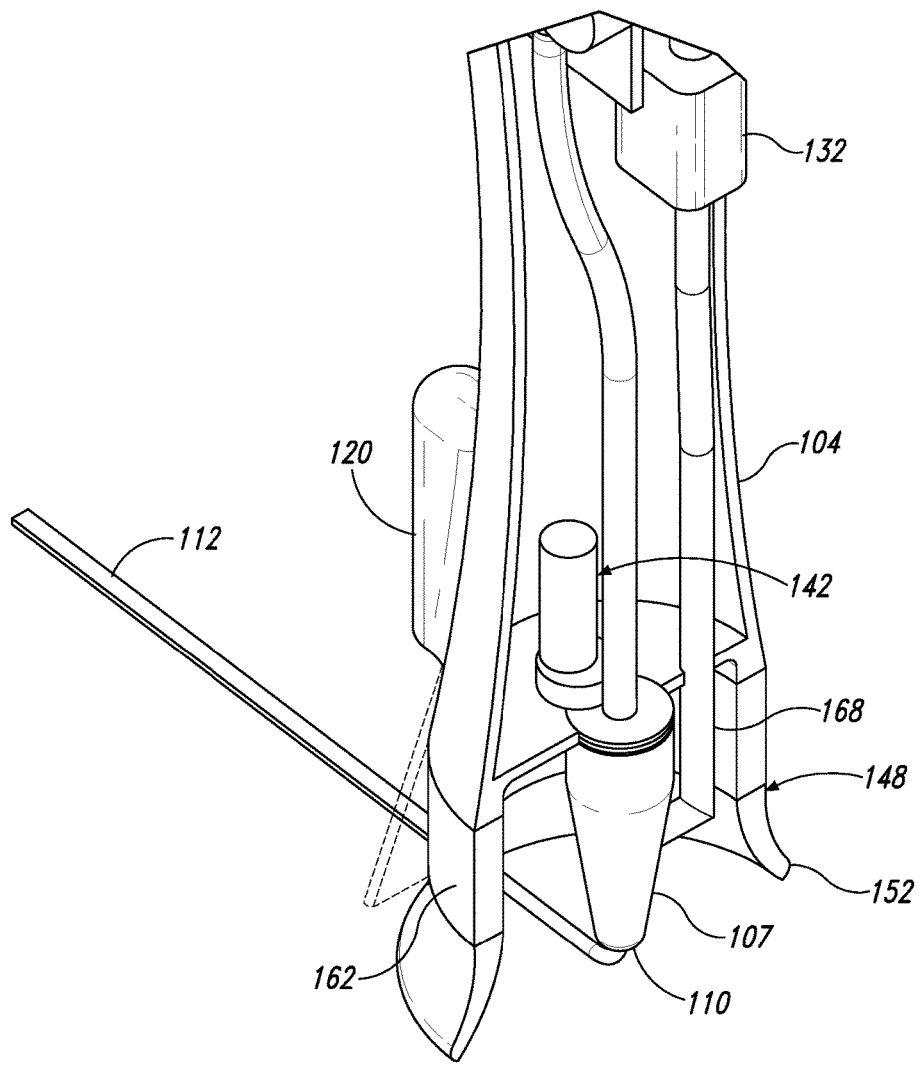
Figure 6:
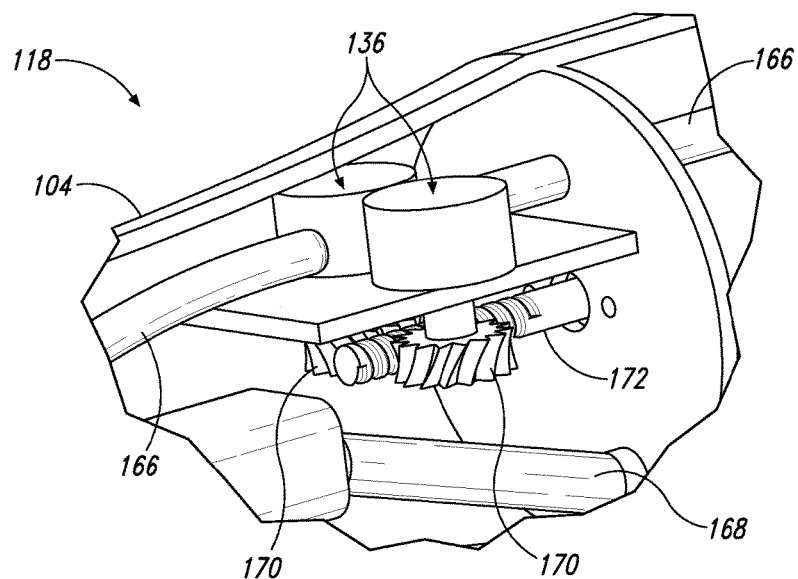
Figure 7:
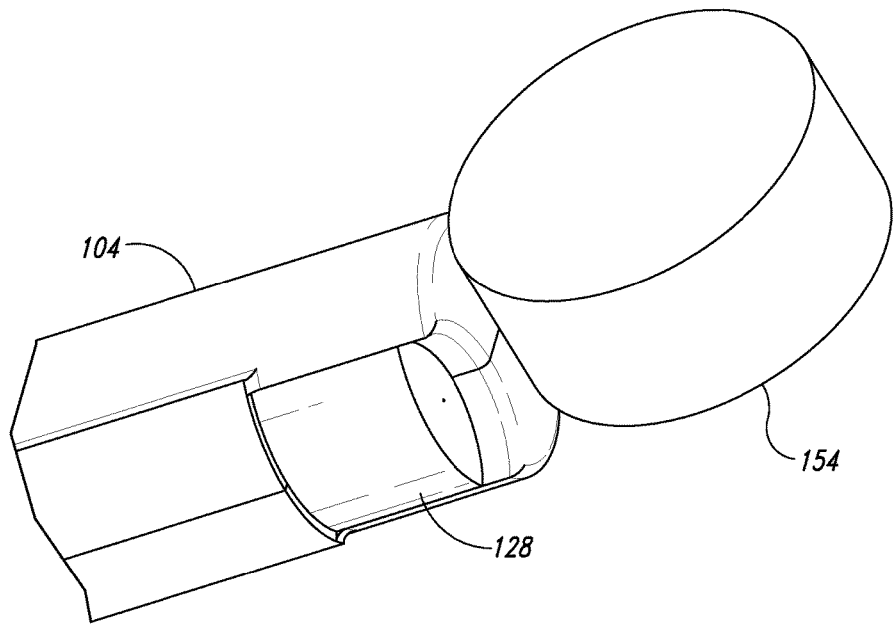
Figure 8:
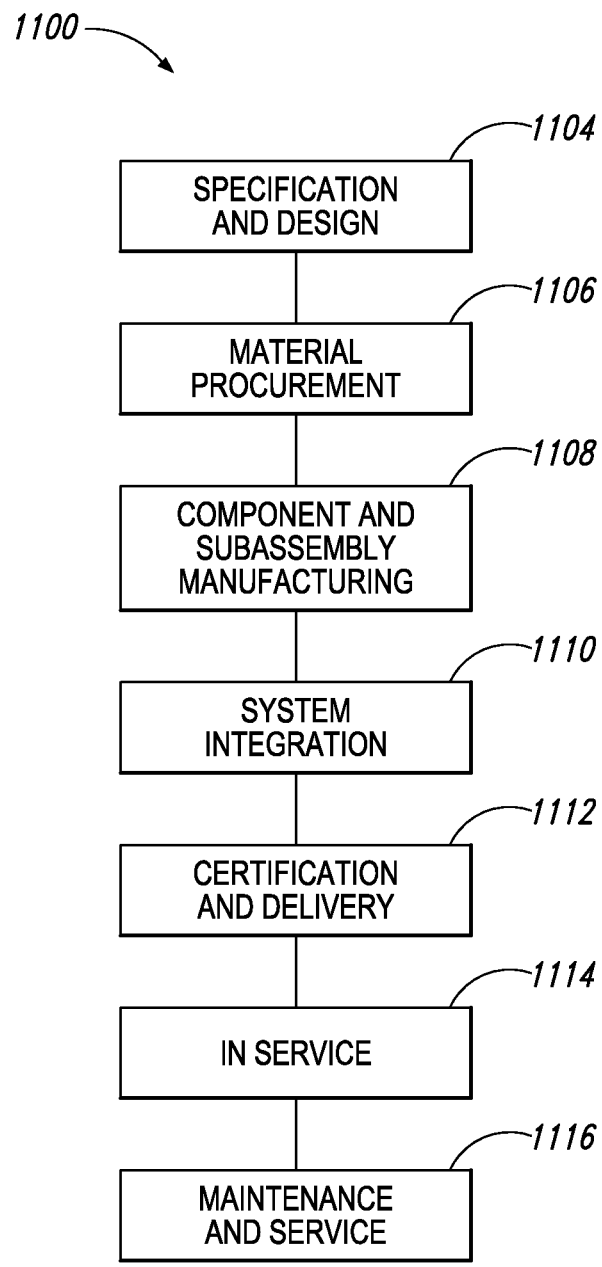
Figure 9:
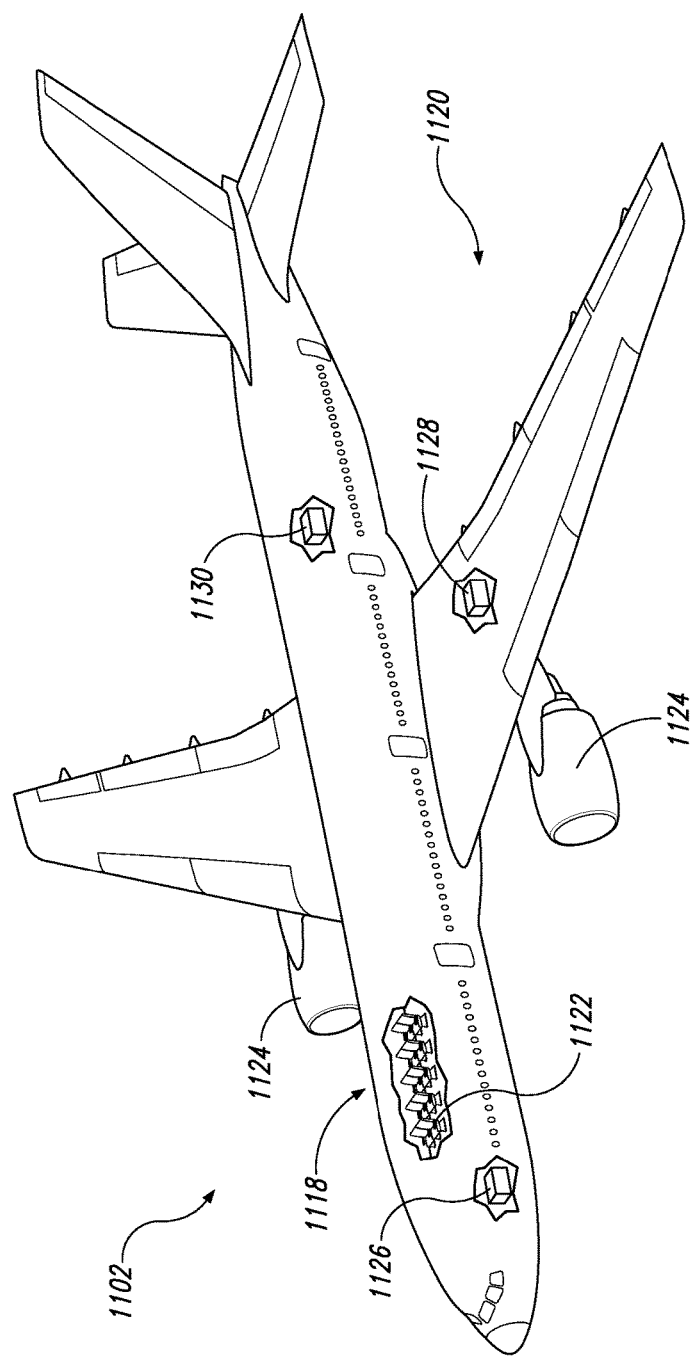

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a system for additively manufacturing a composite part, according to one or more examples of the present disclosure;

FIG. 2 is a perspective view of the system of FIG. 1, according to one or more examples of the present disclosure;

FIG. 3 is a perspective view of a portion of the system of FIG. 1, according to one or more examples of the present disclosure;

FIG. 4 is an exploded view of the system of FIG. 1, according to one or more examples of the present disclosure;

FIG. 5 is a cut-away perspective view of a portion of the system of FIG. 1, according to one or more examples of the present disclosure;

FIG. 6 is a cut-away perspective view of a portion of the system of FIG. 1, according to one or more examples of the present disclosure;

FIG. 7 is a perspective view of a portion of the system of FIG. 1, according to one or more examples of the present disclosure;

FIG. 8 is a block diagram representing aircraft production and service methodologies; and FIG. 9 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 8 and 9, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8 and 9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-7, system 100 for additively manufacturing composite part 102 is disclosed. System 100 comprises housing 104 and nozzle 107. Nozzle 107 is supported by housing 104. Nozzle 107 comprises outlet 110, sized to dispense continuous flexible line 112. Continuous flexible line 112 comprises non-resin component 114 and photopolymer-resin component 116. System 100 also comprises feed mechanism 118, supported within housing 104. Feed mechanism 118 is configured to push continuous flexible line 112 out of outlet 110 of nozzle 107. System 100 further comprises light source 120, supported by housing 104. Light source 120 is configured to deliver a light beam to continuous flexible line 112 after continuous flexible line 112 exits outlet 110 of nozzle 107 to at least partially cure photopolymer-resin component 116 of continuous flexible line 112. The preceding subject matter of this paragraph characterizes example 1 of the present disclosure.

System 100 therefore may be used to manufacture composite parts 102 from at least a photopolymer resin and a non-resin, with the photopolymer resin being a least partially cured while composite part 102 is being manufactured, or in situ, by light source 120. Moreover, system 100 may be used to manufacture composite parts 102 with continuous flexible line 112 being oriented in desired and/or predetermined orientations throughout composite part 102, such as to define desired properties of composite part 102. That is, because nozzle 107, feed mechanism 118, and light source 120 are supported by housing 104, housing 104 may be selectively moved through a predetermined pattern of movements while feed mechanism 118 pushes continuous flexible line 112 out of nozzle 107 and while light source 120 delivers a light beam to continuous flexible line 112, to manufacture composite part 102.

Some examples of system 100 additionally or alternatively may be described as 3-D printers.

As mentioned, feed mechanism 118 is configured to push continuous flexible line 112 out of nozzle 107. In other words, nozzle 107, which deposits continuous flexible line 112 along a print path, is positioned downstream of feed mechanism 118 with respect to a direction of movement of continuous flexible line 112 when composite part 102 is being manufactured by system 100. In some examples, as discussed herein, continuous flexible line 112 is created by system 100 within nozzle 107. In such examples, feed mechanism 118 may therefore engage and push non-resin component 114 into nozzle 107 and thus operatively and indirectly push continuous flexible line 112 out of nozzle 107. In other examples, as discussed herein, continuous flexible line 112 is premade, such as in a prepreg configuration. In such examples, feed mechanism 118 may therefore directly engage and push continuous flexible line 112 into, through, and out of nozzle 107.

As used herein, a "continuous flexible line" is an elongate structure having a length significantly longer than a dimension (e.g., diameter or width) that is transverse, or perpendicular, to its length. As an illustrative, non-exclusive example, continuous flexible line 112 may have a length that is at least 100, at least 1000, at least 10000, at least 100000, or at least 1000000 times greater than its diameter or width.

As used herein, a "photopolymer-resin component" is a resin material that is configured to be cured, or hardened, by selective application of light. As illustrative, non-exclusive examples, photopolymer-resin component 116 may be configured to be at least partially cured, or hardened, when a light beam in the form of ultraviolet light, visible light, infrared light, and/or x-rays is delivered to continuous flexible line 112 by light source 120.

In FIGS. 2-5, the light beam is schematically illustrated as being delivered to continuous flexible line 112 in a fan shape, or fan arrangement. Such a configuration of light source 120 may be beneficial to ensure that continuous flexible line 112 is adequately targeted by light source 120. However, such an arrangement is not required and other configurations of light source 120 and the associated light beam may be used and implemented by system 100.

Referring generally to FIG. 1, non-resin component 114 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 2 of the present disclosure, wherein example 2 also includes the subject matter according to example 1, above.

Inclusion of a fiber or fibers in continuous flexible line 112 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 114 is not limited to the identified examples, and other types of non-resin component 1114 may be used.

Referring generally to FIG. 1, continuous flexible line 112 comprises a prepreg composite material. The preceding subject matter of this paragraph characterizes example 3 of the present disclosure, wherein example 3 also includes the subject matter according to any one of examples 1 or 2, above.

Because continuous flexible line 112 comprises a prepreg composite material, the component parts of continuous flexible line 112, namely non-resin component 114 and photopolymer-resin component 116, may be received by feed mechanism 118, pushed into, through, and out of nozzle 107 to be deposited along a print path as a continuous source material for composite part 102. Moreover, as composite part 102 is being formed, the natural tackiness of the prepreg composite material may facilitate adhesion between layers being deposited by system 100.

As used herein, a "prepreg composite material" is a composite material that includes a structural material, typically a fiber or fibers, impregnated with, or otherwise within, a partially cured matrix, or binding material—in this example, non-resin component 114 is in a matrix of partially cured photopolymer-resin component 116. The binding material is partially cured, or pre-cured, so as to permit handling of the composite material and selective assembly thereof. Prepreg composite material is in contrast with wet-layup and other applications of composite materials where the binding material is applied in liquid form to the underlying structural material during a manufacturing process.

Because photopolymer-resin component 114 is partially cured, and is not in liquid form, or at least not in a low viscosity form, continuous flexible line 112 may be manipulated by system 100, such that photopolymer-resin component 116 and non-resin component 114 remain at least substantially together during manipulation by system 100 and ultimately during deposition along a print path.

In the case of system 100, according to one or more examples thereof, because photopolymer-resin component 116 is partially cured, photopolymer-resin component 116 is a resin material that is configured to be further cured, or further hardened, by selective application of light. As illustrative, non-exclusive examples, photopolymer-resin component 116 may be configured to be further cured, or further hardened, when a light beam in the form of ultraviolet light, visible light, infrared light, and/or x-rays is delivered to continuous flexible line 112 by light source 120 after having exited nozzle 107.

Referring generally to FIG. 1, system 100 further comprises origin 124 of continuous flexible line 112. The preceding subject matter of this paragraph characterizes example 4 of the present disclosure, wherein example 4 also includes the subject matter according to example 3, above.

System 100, with origin 124, includes the material itself that defines continuous flexible line 112. When provided, origin 124 may provide one or more continuous flexible lines 112, such as including a first continuous flexible line 112 with first desired properties and a second continuous flexible line 112 with second desired properties that are different from the first desired properties. For example, when more than one continuous flexible line 112 is provided, different non-resin components 114 and/or different photopolymer-resin components 116 may be selected for desired properties of composite part 102. Origin 124 may be opaque, such as to shield continuous flexible line 112, and more specifically, photopolymer-resin component 116, from light, while continuous flexible line 112 is within origin 124.

Referring generally to FIG. 1, origin 124 is supported by housing 104. The preceding subject matter of this paragraph characterizes example 5 of the present disclosure, wherein example 5 also includes the subject matter according to example 4, above.

By having origin 124 supported by housing 104, origin 124 moves with housing 104 as it is selectively moved to deposit continuous flexible line 112 along a print path. Accordingly, when compared to alternative versions of system 100, in system 100 according to example 5, continuous flexible line 112 may be more easily pulled and pushed through housing 104 by feed mechanism 118.

In some examples, origin 124 may be supported external of housing 104, and in other examples origin 124 may be supported within housing 104.

Referring generally to FIG. 1, origin 124 is separate from housing 104. The preceding subject matter of this paragraph characterizes example 6 of the present disclosure, wherein example 6 also includes the subject matter according to example 4, above.

By having origin 124 separate from housing 104, housing 104 may be less bulky than in examples of system 100 where origin 124 is supported by housing 104. Accordingly, housing 104 may be more easily manipulated by a user, for example. Additionally, origin 124 may be more easily swapped-out, replenished, or otherwise changed with a new continuous flexible line 112.

Referring generally to FIG. 1, feed mechanism 118 is configured to pull continuous flexible line 112 from origin 124. The preceding subject matter of this paragraph characterizes example 7 of the present disclosure, wherein example 7 also includes the subject matter according to any one of examples 4 to 6, above.

Origin 124 therefore may be positioned upstream of feed mechanism 118 with respect to a direction of movement of continuous flexible line 112 when composite part 102 is being manufactured by system 100. Accordingly, feed mechanism 118 may be less complex than in other systems, such as that require motorized spools.

Referring generally to FIG. 1, housing 104 comprises inlet 126, sized to receive continuous flexible line 112 from origin 124. The preceding subject matter of this paragraph characterizes example 8 of the present disclosure, wherein example 8 also includes the subject matter according to any one of examples 4 to 7, above.

Inlet 126 provides an entrance to housing 104 for continuous flexible line 112.

Referring generally to FIG. 1 and particularly to, e.g., FIGS. 2, 4, and 7, system 100 also comprises resin tank 128, configured to hold a volume of photopolymer resin 130. System 100 further comprises resin conduit 168, extending from resin tank 128 to nozzle 107. System 100 further comprises pump 132, operatively coupled to resin conduit 168. Pump 132 is configured to deliver photopolymer resin 130 from resin tank 128 to non-resin component 114 in nozzle 107 to create photopolymer-resin component 116 and continuous flexible line 112 as feed mechanism 118 pushes continuous flexible line 112 out of outlet 110 of nozzle 107. The preceding subject matter of this paragraph characterizes example 9 of the present disclosure, wherein example 9 also includes the subject matter according to any one of examples 1 or 2, above.

System 100 according to example 9 is an example system 100 where continuous flexible line 112 is created by system 100 within nozzle 107 while composite part 102 is being manufactured. More specifically, photopolymer resin 130 is pumped from resin tank 128 to nozzle 107, through which non-resin component 114 is being pushed by feed mechanism 118. As non-resin component 114 is pushed through nozzle 107, photopolymer resin 130 coats, or otherwise adheres to, non-resin component 114 to create photopolymer-resin component 116 and thus continuous flexible line 112.

In such system 100, resin tank 128 may be easily replenished and/or refilled or exchanged for a different photopolymer resin 130, such as having different desired properties, while composite part 102 is being manufactured by system 100. Resin tank 128 may include a vacuum valve to prevent damage to resin tank 128 as photopolymer resin 130 is depleted from resin tank 128.

Referring generally to FIG. 1 and particularly to, e.g., FIGS. 2, 4, and 7, resin tank 128 is supported by housing 104. The preceding subject matter of this paragraph characterizes example 10 of the present disclosure, wherein example 10 also includes the subject matter according to example 9, above.

By having resin tank 128 supported by housing 104, resin tank 128 moves with housing 104 as it is selectively moved to deposit continuous flexible line 112 along a print path. In addition, such an example may make for a compact construction that is more easily manipulated without conduits extending to housing 104 from a remote location.

Referring generally to FIG. 1, resin tank 128 is separate from housing 104. The preceding subject matter of this paragraph characterizes example 11 of the present disclosure, wherein example 11 also includes the subject matter according to example 9, above.

By having resin tank 128 separate from housing 104, housing 104 may be less bulky than in examples of system 100 where resin tank 128 is supported by housing 104. Accordingly, housing 104 may be more easily manipulated by a user, for example. Additionally, resin tank 128 may be more easily replenished or otherwise changed with a new photopolymer resin 130.

Referring generally to FIG. 1, nozzle 107 comprises convergent passage 134, shaped to facilitate uniform application of photopolymer resin 130 to non-resin component 114 as continuous flexible line 112 exits outlet 110 of nozzle 107. The preceding subject matter of this paragraph characterizes example 12 of the present disclosure, wherein example 12 also includes the subject matter according to any one of examples 9 to 11, above.

Convergent passage 134 therefore ensures that a uniform application of photopolymer resin 130 to non-resin component 114 is accomplished as non-resin component 114 is pushed through nozzle 107 by feed mechanism 118 and as continuous flexible line 112 is created within nozzle 107. Such a uniform application of photopolymer resin 130 may be desirable to create a uniform application of photopolymer-resin component 116 on non-resin component 114, as well as to prevent undesirable voids being formed in composite part 102.

Referring generally to FIG. 1, convergent passage 134 is configured to facilitate penetration of photopolymer resin 130 into non-resin component 114. The preceding subject matter of this paragraph characterizes example 13 of the present disclosure, wherein example 13 also includes the subject matter according to example 12, above.

In this example, adequate penetration of photopolymer resin 130 into non-resin component 114 is achieved, such as when non-resin component 114 comprises a bindle, a tow, or a weave of fibers, or otherwise includes fibers with voids or pockets that are desirably filled by photopolymer resin 130 when continuous flexible line 112 is being created.

Referring generally to FIG. 1 and particularly to, e.g., FIG. 7, system 100 further comprises origin 154 of non-resin component 114. The preceding subject matter of this paragraph characterizes example 14 of the present disclosure, wherein example 14 also includes the subject matter according to any one of examples 9 to 13, above.

System 100, with origin 154, includes the material itself that defines non-resin component 114. When provided, origin 154 may provide one or more non-resin components 114, such as including a first non-resin component 114 with first desired properties and a second non-resin component 114 with second desired properties that are different from the first desired properties. For example, when more than one non-resin component 114 is provided, different non-resin components 114 may be selected for desired properties of composite part 102.

Referring generally to FIG. 1 and particularly to, e.g., FIG. 7, origin 154 is supported by housing 104. The preceding subject matter of this paragraph characterizes example 15 of the present disclosure, wherein example 15 also includes the subject matter according to example 14, above.

By having origin 154 supported by housing 104, origin 154 moves with housing 104 as it is selectively moved to deposit continuous flexible line 112 along a print path. Accordingly, when compared to alternative versions of system 100, in system 100 according to example 15, non-resin component 114 may be more easily pulled and pushed through housing 104 by feed mechanism 118.

Referring generally to FIG. 1, origin 154 is separate from housing 104. The preceding subject matter of this paragraph characterizes example 16 of the present disclosure, wherein example 16 also includes the subject matter according to example 14, above.

By having origin 154 separate from housing 104, housing 104 may be less bulky than in examples of system 100 where origin 154 is supported by housing 104. Accordingly, housing 104 may be more easily manipulated by a user, for example. Additionally, origin 154 may be more easily swapped-out, replenished, or otherwise changed with a new non-resin component 114.

Referring generally to FIG. 1 and particularly to, e.g., FIGS. 4 and 6, feed mechanism 118 is configured to pull non-resin component 114 from origin 154. The preceding subject matter of this paragraph characterizes example 17 of the present disclosure, wherein example 17 also includes the subject matter according to any one of examples 14 to 16, above.

Origin 154 therefore may be positioned upstream of feed mechanism 118 with respect to a direction of movement of non-resin component 114 when composite part 102 is being manufactured by system 100. Accordingly, feed mechanism 118 may be less complex than in other systems, such as that require motorized spools.

Referring generally to FIG. 1 and particularly to, e.g., FIGS. 2 and 4, housing 104 comprises inlet 126, sized to receive non-resin component 114 from origin 154. The preceding subject matter of this paragraph characterizes example 18 of the present disclosure, wherein example 18 also includes the subject matter according to any one of examples 14 to 17, above.

Inlet 126 provides an entrance to housing 104 for non-resin component 114.

Referring generally to FIG. 1, system 100 further comprises pump adjustment mechanism 176, supported by housing 104, operatively coupled to pump 132, and configured to selectively adjust a pump rate of pump 132 responsive to an external input. The preceding subject matter of this paragraph characterizes example 19 of the present disclosure, wherein example 19 also includes the subject matter according to any one of examples 9 to 18, above.

Pump adjustment mechanism 176 provides a way for a user to selectively adjust and select a desired flow rate of photopolymer resin 130 from resin tank 128 to nozzle 107. For example, the flow rate of photopolymer resin 130 may depend upon how fast housing 104 is being manipulated to deposit continuous flexible line 112 from nozzle 107 and thus upon how fast continuous flexible line 112 is being created during use of system 100.

Pump adjustment mechanism 176 may take any suitable form, including (but not limited to) one or more buttons, dials, switches, etc. that are configured to receive an external input from a user to adjust the pump rate of pump 132. In some examples, pump adjustment mechanism 176 may be continuously adjustable, such as via a potentiometer, and in other examples, pump adjustment mechanism 176 may have discrete settings, such as with two more set volumetric pump rates.

As used herein, "an external input" may be any input from outside of system 100, such as by a user that physically presses a button, rotates a dial, switches a switch, etc. or by some automated mechanism associated with system 100, such as by a software-operated mechanism, robot, or other machine.

Referring generally to FIG. 1 and particularly to, e.g., FIGS. 2-4 and 6, feed mechanism 118 comprises opposing rollers 136, supported within housing 104. Opposing rollers 136 are configured to engage opposite sides of non-resin component 114. Feed mechanism 118 also comprises motor 138, operatively coupled to at least one of opposing rollers 136 and configured to selectively rotate at least one of opposing rollers 136 to push continuous flexible line 112 out of outlet 110 of nozzle 107. Feed mechanism 118 further comprises feed input mechanism 140, supported by housing 104 and configured to selectively actuate motor 138 and pump 132 when feed input mechanism 140 receives an external input. The preceding subject matter of this paragraph characterizes example 20 of the present disclosure, wherein example 20 also includes the subject matter according to any one of examples 9 to 19, above.

Opposing rollers 136, therefore, when selectively rotated, act to frictionally engage non-resin component 114, thereby feeding it between opposing rollers 136 and pushing it into nozzle 107 and ultimately through outlet 110 as part of continuous flexible line 112. Motor 138 provides the motive force to opposing rollers 136, and feed input mechanism 140 selectively actuates motor 138 upon receipt of an external input. Moreover, in example 20, which includes the subject matter of example 9, feed input mechanism 140 also selectively actuates pump 132 upon receipt of an external input. Accordingly, when feed input mechanism 140 is engaged, both non-resin component 114 and photopolymer resin 130 are fed into nozzle 107, where they are combined to create continuous flexible line 112. Conversely, when feed input mechanism 140 is disengaged, the delivery of non-resin component 114 and photopolymer resin 130 to nozzle 107 is ceased. As a result, the creation of continuous flexible line 112 may be selectively started and stopped as housing 104 is manipulated to manufacture composite part 102.

Feed input mechanism 140 may take any suitable form, including (but not limited to) one or more buttons, dials, switches, etc. that are configured to receive an external input from a user to selectively actuate at least motor 138. In some examples, feed input mechanism 140 may be continuously adjustable, such as via a potentiometer, to provide for variable motor speed, and in other examples, feed mechanism 140 may simply have a binary on/off configuration.

Referring generally to FIG. 1 and particularly to, e.g., FIGS. 2-4 and 6, feed mechanism 118 comprises opposing rollers 136, supported within housing 104. Opposing rollers 136 are configured to engage opposite sides of continuous flexible line 112 or non-resin component 114. Feed mechanism 118 also comprises motor 138, operatively coupled to at least one of opposing rollers 136 and configured to selectively rotate at least one of opposing rollers 136 to push continuous flexible line 112 out of outlet 110 of nozzle 107. The preceding subject matter of this paragraph characterizes example 21 of the present disclosure, wherein example 21 also includes the subject matter according to any one of examples 1 to 19, above.

In example 21, opposing rollers 136, when selectively rotated, act to frictionally engage continuous flexible line 112 or non-resin component 114. As with example 20, in example 21, motor 138 provides the motive force to opposing rollers 136. When example 21 includes the subject matter of example 3, opposing rollers 136 frictionally engage continuous flexible line 112, since continuous flexible line 112 is in the form of a prepreg material. In contrast, when example 21 includes the subject matter of example 9, opposing rollers 136 frictionally engage non-resin component 114, since continuous flexible line 112 is created in nozzle 107 downstream of feed mechanism 118.

Referring generally to FIG. 1 and particularly to, e.g., FIGS. 2-4 and 6, feed mechanism 118 further comprises feed input mechanism 140, supported by housing 104. Feed input mechanism 140 is configured to selectively actuate motor 138 when feed input mechanism 140 receives an external input. The preceding subject matter of this paragraph characterizes example 22 of the present disclosure, wherein example 22 also includes the subject matter according to example 21, above.

As with example 20, in example 22, feed input mechanism 140 selectively actuates motor 138 upon receipt of an external input. However, in example 22, feed input mechanism 140 does not necessarily also selectively actuate pump 132 upon receipt of an external input. For example, when example 22 includes the subject matter of example 3, photopolymer-resin component 116 is already part of continuous flexible line 112 and there is no liquid photopolymer resin 130 to be pumped to nozzle 107. That said, it is within the scope of example 22, such as when including the subject matter of example 9, that feed input mechanism 140 actuates both motor 138 and pump 132.

Accordingly, according to example 22, when feed input mechanism 140 is engaged, either non-resin component 114 or continuous flexible 112 is fed into nozzle 107. Conversely, when feed input mechanism 140 is disengaged, the delivery of non-resin component 114 or continuous flexible line 112 to nozzle 107 is ceased. As a result, the depositing of continuous flexible line 112 via nozzle 107 may be selectively started and stopped as housing 104 is manipulated to manufacture composite part 102.

Referring generally to FIG. 1 and particularly to, e.g., FIGS. 2-4 and 6, feed input mechanism 140 is further configured to selectively actuate light source 120 when feed input mechanism 140 receives an external input. The preceding subject matter of this paragraph characterizes example 23 of the present disclosure, wherein example 23 also includes the subject matter according to example 22, above.

Accordingly, according to example 23, when feed input mechanism 140 is engaged to selectively deliver continuous flexible line 112 from nozzle 107, light source 120 also is automatically actuated. As a result, a battery or other power support associated with light source 120 may be conserved without a user needing to separately and selectively actuate light source 120.

Referring generally to FIG. 1 and particularly to, e.g., FIGS. 4 and 6, each of opposing rollers 136 comprises worm gear 170. Feed mechanism 118 further comprises worm drive 172, operatively coupled to motor 138 and meshed with each of worm gears 170. The preceding subject matter of this paragraph characterizes example 24 of the present disclosure, wherein example 24 also includes the subject matter according to any one of examples 20 to 23, above.

Inclusion of worm gears 170 and worm drive 172 may provide for a compact volume of housing 104 and system 100.

Referring generally to FIG. 1, feed mechanism 118 further comprises feed adjustment mechanism 174, supported by housing 104 and configured to selectively adjust a rotational speed of motor 138 responsive to an external input. The preceding subject matter of this paragraph characterizes example 25 of the present disclosure, wherein example 25 also includes the subject matter according to any one of examples 20 to 24, above.

Feed adjustment mechanism 174 provides a way for a user to selectively adjust and select a desired rotational speed of motor 138 and thus a desired feed rate of continuous flexible line 112 out of nozzle 107. For example, the feed rate of continuous flexible line 112 needs to match the speed at which housing 104 and nozzle 107 are being manipulated to deposit continuous flexible line 112 via nozzle 107. By providing for selective adjustment of the feed rate, it may be turned down when a more complex or more critical portion of composite part 102 is being formed, and it may be turned up when a less complex or less critical portion of composite part 102 is being formed, for example.

Feed adjustment mechanism 174 may take any suitable form, including (but not limited to) one or more buttons, dials, switches, etc. that are configured to receive an external input from a user to adjust the rotational speed of motor 138. In some examples, feed adjustment mechanism 174 may be continuously adjustable, such as via a potentiometer, and in other examples, feed adjustment mechanism 174 may have discrete settings, such as with two more set rotational speeds for motor 138.

Referring generally to FIG. 1 and particularly to, e.g., FIGS. 2-5, system 100 further comprises cutter 142, supported by housing 104 and configured to selectively cut non-resin component 114 or continuous flexible line 112 adjacent to nozzle 107. Cutter 142 comprises cutter input mechanism 146, supported by housing 104 and configured to selectively cut non-resin component 114 or continuous flexible line 112 and to selectively stop motor 138 responsive to an external input. The preceding subject matter of this paragraph characterizes example 26 of the present disclosure, wherein example 26 also includes the subject matter according to any one of examples 20 to 25, above.

Inclusion of cutter 142 permits for the selective stopping and starting of delivery of continuous flexible line 112 via nozzle 107. Moreover, by having cutter 142 configured to cut non-resin component 114 or continuous flexible line 112 adjacent to nozzle 107, non-resin component 114 or continuous flexible line 112 may be cut prior to photopolymer-resin component 116 being cured by light source 120, and while continuous flexible line 112 is not yet in contact with, and optionally compacted against, a prior deposited layer of continuous flexible line 112. In other words, access to an entirety of the circumference of non-resin component 114 or continuous flexible line 112 by cutter 142 is permitted.

According to example 26, cutter input mechanism 146, upon receipt of an external input, not only actuates cutter 142, but also selectively stops motor 138. When a user selectively engages cutter input mechanism 146 to cut non-resin component 114 or continuous flexible line 112, presumably the user is doing so because continuous flexible line 112 is desired to be terminated, such as at the end of a movement, to initiate deposition at a different location on composite part 102, or for some other reason. Accordingly, it is desirable to simultaneously cease feeding of non-resin component 114 or continuous flexible line 112 out of nozzle 107.

When example 26 includes the subject matter of example 3, cutter 142 is configured to selectively cut continuous flexible line 112. When example 26 includes the subject matter of example 9, cutter 142 may be configured to selectively cut only non-resin component 114, such as when cutter 142 is positioned upstream of nozzle 107, as continuous flexible line 112 is created within nozzle 107.

Cutter input mechanism 146 may take any suitable form, including (but not limited to) one or more buttons or switches that are configured to receive an external input from a user to selectively actuate at least cutter 142.

Referring generally to FIG. 1 and particularly to, e.g., FIGS. 4 and 5, system 100 further comprises cutter 142, supported by housing 104 and configured to selectively cut non-resin component 114 or continuous flexible line 112 adjacent to nozzle 107. The preceding subject matter of this paragraph characterizes example 27 of the present disclosure, wherein example 27 also includes the subject matter according to any one of examples 1 to 25, above.

Again, inclusion of cutter 142 permits for the selective stopping and starting of delivery of continuous flexible line 112 via nozzle 107. Moreover, by having cutter 142 configured to cut non-resin component 114 or continuous flexible line 112 adjacent to nozzle 107, non-resin component 114 or continuous flexible line 112 may be cut prior to photopolymer-resin component 116 being cured by light source 120, and while continuous flexible line 112 is not yet in contact with, and optionally compacted against, a prior deposited layer of continuous flexible line 112. In other words, access to an entirety of the circumference of non-resin component 114 or continuous flexible line 112 by cutter 142 is permitted.

Referring generally to FIG. 1 and particularly to, e.g., FIGS. 2-5, cutter 142 comprises cutter input mechanism 146, supported by housing 104 and configured to selectively cut non-resin component 114 or continuous flexible line 112 responsive to an external input. The preceding subject matter of this paragraph characterizes example 28 of the present disclosure, wherein example 28 also includes the subject matter according to example 27, above.

Inclusion of cutter input mechanism 146 permits for the selective cutting of non-resin component 114 or continuous flexible line 112 at a desired moment in time.

Referring generally to FIG. 1, cutter 142 comprises at least one blade 144, movable relative to housing 104 and positioned to selectively cut non-resin component 114 or continuous flexible line 112. The preceding subject matter of this paragraph characterizes example 29 of the present disclosure, wherein example 29 also includes the subject matter according to any one of examples 26 to 28, above.

Inclusion of at least one blade 144 may provide for a cost-effective cutter 142.

Referring generally to FIG. 1 and particularly to, e.g., FIGS. 2-5, system 100 further comprises skirt 148, extending from housing 104 adjacent to nozzle 107. Skirt 148 is configured to impart a compaction force against continuous flexible line 112 after continuous flexible line 112 exits outlet 110 of nozzle 107 responsive to application of a force toward skirt 148. The preceding subject matter of this paragraph characterizes example 30 of the present disclosure, wherein example 30 also includes the subject matter according to any one of examples 1 to 29, above.

Responsive to an applied force, for example, via housing 104, skirt 148 is used to impart a compaction force against continuous flexible line 112 after it exits nozzle 107 and is deposited against a surface or against a prior deposited layer of continuous flexible line 112. Accordingly, adjacent layers of continuous flexible line 112 that have been deposited via nozzle 107 may be compacted together. By extending from housing 104 adjacent to nozzle 107, skirt 148 is positioned to compact continuous flexible line 112 as it exits nozzle 107. The applied force may be responsive to a user or a robot pushing on housing 104 toward skirt 148 and toward continuous flexible line 112 that has exited nozzle 107.

Referring generally to FIG. 1 and particularly to, e.g., FIGS. 2-5, skirt 148 extends only partially circumferentially around nozzle 107. The preceding subject matter of this paragraph characterizes example 31 of the present disclosure, wherein example 31 also includes the subject matter according to example 30, above.

By extending only partially circumferentially around nozzle 107, a user may more easily view continuous flexible line 112 as it exits nozzle and thus more easily manipulate movement of nozzle 104 in a desired orientation and direction for deposition of continuous flexible line 112.

In the example of FIGS. 2-5, skirt 148 extends from the same side of housing 104, on which light source 120 is positioned. Accordingly, skirt 148 and light source 120 are positioned on a side of housing that is intended to trail movement of housing 104 and nozzle 107 during deposition, compaction, and curing of continuous flexible line 112.

Referring generally to FIG. 1 and particularly to, e.g., FIGS. 2-5, skirt 148 comprises viewing window 162, configured to provide a line of sight through skirt 148 to nozzle 107. The preceding subject matter of this paragraph characterizes example 32 of the present disclosure, wherein example 32 also includes the subject matter according to any one of examples 30 or 31, above.

Viewing window 162 provides a line of sight through skirt 148 to nozzle 107, so that a user may more easily observe continuous flexible line 112 exiting nozzle 107.

Viewing window 162, for example, may be formed from a transparent material. Alternatively, skirt 148 may define an open passage as viewing window 162 with no material being present within viewing window 162.

Referring generally to FIG. 1 and particularly to, e.g., FIGS. 2-5, skirt 148 comprises a resilient material. The preceding subject matter of this paragraph characterizes example 33 of the present disclosure, wherein example 33 also includes the subject matter according to any one of examples 30 to 32, above.

By being formed of a resilient material, skirt 148 may deform slightly responsive to a compaction force applied against continuous flexible line 112. As a result, a user may more easily control a desired level of compaction and avoid unintended scraping of continuous flexible line, such as that may result in inadvertent removal of photopolymer-resin component 116 that may be caused by a more rigid construction of skirt 148.

Non-exhaustive examples of resilient materials from which skirt 148 may be constructed include rubbers and silicones.

Referring generally to FIG. 1, skirt 148 comprises rim 152, which is textured to impart a texture to continuous flexible line 112 responsive to the compaction force and to relative movement between skirt 148 and continuous flexible line 112. The preceding subject matter of this paragraph characterizes example 34 of the present disclosure, wherein example 34 also includes the subject matter according to any one of examples 30 to 33, above.

When rim 152 is textured, rim 152 imparts a texture to continuous flexible line 112 when compacting continuous flexible line 112, providing it with increased surface area for better adhesion of a subsequent layer of continuous flexible line 112 deposited against it.

Referring generally to FIG. 1, outlet 110 of the nozzle (107) is configured to impart a texture to continuous flexible line 112 as continuous flexible line 112 exits outlet 110 of nozzle 107. The preceding subject matter of this paragraph characterizes example 35 of the present disclosure, wherein example 35 also includes the subject matter according to any one of examples 1 to 34, above.

By imparting a texture to continuous flexible line 112 as it exits nozzle 107, a desired adhesion between layers of continuous flexible line 112 being deposited may be achieved. Moreover, a texture to an entirety of the circumference of continuous flexible line 112 results, thereby facilitating adhesion not only between vertically adjacent layers of continuous flexible line 112, but also between laterally adjacent extensions of continuous flexible line 112.

Referring generally to FIG. 1 and particularly to, e.g., FIGS. 2-4, light source 120 comprises light-source input mechanism 122, supported by housing 104 and configured to selectively actuate the light beam responsive to an external input to selectively and at least partially cure photopolymer-resin component 116 of continuous flexible line 112. The preceding subject matter of this paragraph characterizes example 36 of the present disclosure, wherein example 36 also includes the subject matter according to any one of examples 1 to 35, above.

Light-source input mechanism 122 selectively actuates light source 120 so that the light beam will become incident upon continuous flexible line 112 after exiting nozzle 107 at thereby at least partially cure continuous flexible line 112 as composite part 102 is being manufactured.

Light-source input mechanism 122 may take any suitable form, including (but not limited to) one or more buttons, dials, switches, etc. that are configured to receive an external input from a user to selectively actuate light source 120.

Referring generally to FIG. 1, light source 120 comprises light frequency adjustment mechanism 178, configured to selectively adjust a pulse frequency of light source 120 responsive to an external input. The preceding subject matter of this paragraph characterizes example 37 of the present disclosure, wherein example 37 also includes the subject matter according to any one of examples 1 to 36, above.

Light frequency adjustment mechanism 178 provides a way for a user to selectively adjust and select a desired pulse frequency of light source 120. For example, different pulse frequencies may be desired to impart different levels of cure of continuous flexible line 112 and/or different types of photopolymer-resin components 116 may require different pulse frequencies for a desired amount of cure.

Light frequency adjustment mechanism 178 may take any suitable form, including (but not limited to) one or more buttons, dials, switches, etc. that are configured to receive an external input from a user to adjust the pulse frequency of light source 120. In some examples, light frequency adjustment mechanism 178 may be continuously adjustable, such as via a potentiometer, and in other examples, light frequency adjustment mechanism 178 may have discrete settings, such as with two more set pulse frequency settings for light source 120.

Referring generally to FIG. 1, light source 120 comprises light duration adjustment mechanism 180, configured to selectively adjust a duration of light source 120 responsive to an external input. The preceding subject matter of this paragraph characterizes example 38 of the present disclosure, wherein example 38 also includes the subject matter according to any one of examples 1 to 37, above.

Light duration adjustment mechanism 180 provides a way for a user to selectively adjust and select a desired duration of light source 120 emitting the light beam.

Light duration adjustment mechanism 180 may take any suitable form, including (but not limited to) one or more buttons, dials, switches, etc. that are configured to receive an external input from a user to adjust the duration of light source 120 emitting the light beam. In some examples, light duration adjustment mechanism 180 may be continuously adjustable, such as via a potentiometer, and in other examples, light duration adjustment mechanism 180 may have discrete settings, such as with two more set durations of time for light source 120 to emit the light beam.

Referring generally to FIG. 1, system 100 further comprises one or more templates 156, configured to be placed against surface 108. Each template 156 comprises a boundary configured to define composite part 102 when continuous flexible line 112 is dispensed from nozzle 107 within the boundary. The preceding subject matter of this paragraph characterizes example 39 of the present disclosure, wherein example 39 also includes the subject matter according to any one of examples 1 to 38, above.

Templates 156 may provide an efficient way for a user to create a desired composite part 102 by providing a boundary within which continuous flexible line 112 may be easily deposited by system 100. In some applications, such templates may be used to create replacement parts in the field, such as to repair a damaged part of an apparatus, such as a vehicle, an aircraft, or any other apparatus requiring repair.

Referring generally to FIG. 1, one or more templates 156 correspond to one or more unique parts to be manufactured by system 100. The preceding subject matter of this paragraph characterizes example 40 of the present disclosure, wherein example 40 also includes the subject matter according to example 39, above.

By having available a plurality of templates, various composite parts 102 may be easily manufactured with system 100.

Referring generally to FIG. 1, housing 104 is sized to be held and manipulated by a human user. The preceding subject matter of this paragraph characterizes example 41 of the present disclosure, wherein example 41 also includes the subject matter according to any one of examples 1 to 40, above.

By being sized to be held and manipulated by a human user, housing 104 and system 100, as a whole, may be easily transportable and used to manufacture composite parts 102 at any desired location, including in the field, such as to repair or replace a damaged part.

In some examples, housing 104 may be sized to be held and manipulated by a single hand of a human user. In some examples, housing 104 may be sized to be held and manipulated by both hands of a human user.

Additionally or alternatively, housing 104 and/or system 100, as a whole, may be sized and configured to be used as an end effector of a robot, such as a robotic arm.

Referring generally to FIG. 1, system 100 further comprises controller 160 and one or more of pump 132, operatively coupled to resin tank 128, and configured to deliver photopolymer resin 130 from resin tank 128 to non-resin component 114 to create photopolymer-resin component 116 as feed mechanism 118 pushes continuous flexible line 112 out of outlet 110 of nozzle 107; pump adjustment mechanism 176, supported by housing 104 that is operatively coupled to pump 132 and is configured to selectively adjust a pump rate of pump 132 responsive to an external input; motor 138, operatively coupled to roller 136 and configured to selectively rotate roller 136 to push continuous flexible line 112 out of outlet 110 of nozzle 107; feed input mechanism 140, supported by housing 104 and configured to selectively actuate motor 138 when feed input mechanism 140 receives an external input; feed adjustment mechanism 174, supported by housing 104 and configured to selectively adjust a rotational speed of motor 138 responsive to an external input; cutter 142, supported by housing 104 and configured to selectively cut continuous flexible line 112 adjacent to nozzle 107; cutter input mechanism 146, supported by housing 104 and configured to selectively cut continuous flexible line 112 responsive to an external input; light-source input mechanism 122, supported by housing 104 and configured to selectively actuate the light beam responsive to an external input to selectively and at least partially cure photopolymer-resin component 116 of continuous flexible line 112; light frequency adjustment mechanism 178, configured to selectively adjust a pulse frequency of light source 120 responsive to an external input; and light duration adjustment mechanism 180, configured to selectively adjust a duration of light source 120 responsive to an external input. Controller 160 is communicatively coupled to one or more of feed mechanism 118, light source 120, pump 132, pump adjustment mechanism 176, motor 138, feed input mechanism 140, feed adjustment mechanism 174, cutter 142, cutter input mechanism 146, light-source input mechanism 122, light frequency adjustment mechanism 178, and light duration adjustment mechanism 180. Controller 160 is programmed to selectively operate one or more of feed mechanism 118, light source 120, pump 132, motor 138, and cutter 142. The preceding subject matter of this paragraph characterizes example 42 of the present disclosure, wherein example 42 also includes the subject matter according to any one of examples 1 to 41, above.

Controller 160 controls the operation of various component parts of system 100.

Controller 160 may include any suitable structure that may be adapted, configured, designed, constructed, and/or programmed to control the operation of at least a portion of system 100. As illustrative, non-exclusive examples, controller 160 may include and/or be an electronic controller, a dedicated controller, a special-purpose controller, a personal computer, a display device, a logic device, and/or a memory device. In addition, controller 160 may be programmed to perform one or more algorithms to automatically control the operation of system 100. As an illustrative example only, controller 160 may comprise an ARDUINO™ Pro Mini micro controller board with an ATmega328 micro controller.

Referring generally to FIG. 1 and particularly to, e.g., FIG. 4, system 100 further comprises battery 164, operatively coupled to one or more of controller 160, feed mechanism 118, light source 120, pump 132, pump adjustment mechanism 176, motor 138, feed input mechanism 140, feed adjustment mechanism 174, cutter 142, cutter input mechanism 146, light-source input mechanism 122, light frequency adjustment mechanism 178, and light duration adjustment mechanism 180. The preceding subject matter of this paragraph characterizes example 43 of the present disclosure, wherein example 43 also includes the subject matter according to example 42, above.

Battery 164 provides power for various component parts of system 100.

Referring generally to FIG. 1 and particularly to, e.g., FIGS. 4-6, system 100 further comprises line tube 166, supported by housing 104 and configured to provide a path at least for non-resin component 114 to and from feed mechanism 118 and to nozzle 107. The preceding subject matter of this paragraph characterizes example 44 of the present disclosure, wherein example 44 also includes the subject matter according to any one of examples 1 to 43, above.

Line tube 166 provides a path for non-resin component 114 or continuous flexible line 112 to travel to and from feed mechanism 118 and to nozzle 107.

When example 44 includes the subject matter of example 3, line tube 166 provides a path for continuous flexible line 112. When example 44 includes the subject matter of example 9, line tube 166 provides a path for non-resin component 114.

Examples of the present disclosure may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A handheld system for additively manufacturing a composite part, the system comprising:
   a housing, sized to be held and manipulated by a single hand of a human user;
   a nozzle, supported by the housing, wherein the nozzle comprises an outlet, sized to dispense a continuous flexible line, and the continuous flexible line comprises a non-resin component and a photopolymer-resin component;
   an origin, comprising a supply of the non-resin component, wherein the origin is supported by the housing;
   a resin tank, supported by the housing and configured to hold a volume of photopolymer resin;

a resin conduit, extending from the resin tank to the nozzle; and a pump, supported by the housing and operatively coupled to the resin conduit, wherein the pump is configured to deliver the photopolymer resin from the resin tank to the non-resin component in the nozzle to create the photopolymer-resin component and the continuous flexible line;

a feed mechanism configured to pull the non-resin component from the origin and to push the continuous flexible line out of the outlet of the nozzle, wherein the feed mechanism comprises:

opposing rollers, configured to engage opposite sides of the non-resin component;

a motor, operatively coupled to at least one of the opposing rollers and configured to selectively rotate at least one of the opposing rollers to pull the non-resin component from the origin and to push the continuous flexible line out of the outlet of the nozzle; and a feed input mechanism, configured to actuate the motor and the pump when the feed input mechanism receives a single manual external input from the single hand of the human user while the single hand of the human user holds and manipulates the housing; and a light source, supported by the housing, wherein the light source is configured to deliver a light beam to the continuous flexible line after the continuous flexible line exits the outlet of the nozzle to at least partially cure the photopolymer-resin component of the continuous flexible line.

2. The system according to claim 1, wherein the nozzle comprises a convergent passage, shaped to facilitate uniform application of the photopolymer resin to the non-resin component as the continuous flexible line exits the outlet of the nozzle, and wherein the convergent passage is configured to facilitate penetration of the photopolymer resin into the non-resin component.

3. The system according to claim 1, further comprising a pump adjustment mechanism, supported by the housing, operatively coupled to the pump, and configured to selectively adjust a pump rate of the pump responsive to a manual input from the human user.

4. The system according to claim 1, wherein the feed input mechanism is further configured to selectively actuate the light source when the feed input mechanism receives the single manual external input from the single hand of the human user while the single hand of the human user holds and manipulates the housing.

5. The system according to claim 1, wherein the feed mechanism further comprises a feed adjustment mechanism, supported by the housing and configured to selectively adjust a rotational speed of the motor responsive to a manual input from the human user.

6. The system according to claim 1, further comprising a cutter, supported by the housing and configured to selectively cut the continuous flexible line adjacent to the nozzle, wherein the cutter comprises a cutter input mechanism, supported by the housing, extending through the housing, and configured to selectively cut the continuous flexible line responsive to a manual input from the single hand of the human user while the single hand of the human user holds and manipulates the housing.

7. The system according to claim 1, further comprising a skirt, extending from the housing adjacent to the nozzle, wherein the skirt is configured to impart a compaction force against the continuous flexible line after the continuous flexible line exits the outlet of the nozzle responsive to application of a force, applied by the single hand of the human user to the housing in the direction of the skirt.

8. The system according to claim 7, wherein the skirt extends only partially circumferentially around the nozzle.

9. The system according to claim 7, wherein the skirt comprises a viewing window, configured to provide a line of sight through the skirt to the nozzle.

10. The system according to claim 7, wherein:
the skirt comprises a rim; and
the rim is textured to impart a texture to the continuous flexible line responsive to the compaction force and to relative movement between the skirt and the continuous flexible line.

11. The system according to claim 1, wherein the outlet of the nozzle is configured to impart a texture to the continuous flexible line as the continuous flexible line exits the outlet of the nozzle.

12. The system according to claim 1, wherein the light source comprises a light-source input mechanism, supported by the housing, extending through the housing, and configured to selectively actuate the light beam responsive to a manual input from the single hand of the human user while the single hand of the human user holds and manipulates the housing to selectively and at least partially cure the photopolymer-resin component of the continuous flexible line.

13. The system according to claim 1, wherein the light source comprises a light frequency adjustment mechanism, supported by the housing and configured to selectively adjust a pulse frequency of the light source responsive to a manual input from the human user.

14. The system according to claim 1, wherein the light source comprises a light duration adjustment mechanism, supported by the housing and configured to selectively adjust a duration of the light source responsive to a manual input from the human user.

15. The system according to claim 1, further comprising a cutter, supported by the housing and configured to selectively cut the continuous flexible line adjacent to the nozzle, wherein the cutter comprises a cutter input mechanism, supported by the housing and configured to selectively cut the continuous flexible line and to selectively stop the motor responsive to a manual input from the single hand of the human user while the single hand of the human user holds and manipulates the housing.

16. The system according to claim 1, further comprising one or more templates, configured to be placed against a surface, wherein each of the one or more templates comprises a boundary, configured to define the composite part when the continuous flexible line is dispensed from the nozzle within the boundary responsive to the human user holding and manipulating the housing with the single hand of the human user.

17. The system according to claim 16, wherein the one or more templates correspond to one or more unique parts to be manufactured by the system.

18. The system according to claim 1, wherein the feed input mechanism comprises a button, supported by the housing.

19. The system according to claim 7, wherein the skirt comprises a resilient material.

20. A handheld system for additively manufacturing a composite part, the system comprising:
a housing, sized to be held and manipulated by a single hand of a human user;

an origin, comprising a supply of a continuous flexible line, supported by the housing, wherein the continuous flexible line comprises a prepreg composite material that comprises a non-resin component and a photopolymer-resin component;

a nozzle, supported by the housing, wherein the nozzle comprises an outlet, sized to dispense the continuous flexible line;

a feed mechanism, supported within the housing, wherein the feed mechanism is configured to pull the continuous flexible line from the origin and push the continuous flexible line out of the outlet of the nozzle, wherein the feed mechanism comprises:

opposing rollers, configured to engage opposite sides of the continuous flexible line;

a motor, operatively coupled to at least one of the opposing rollers and configured to selectively rotate at least one of the opposing rollers to pull the continuous flexible line from the origin and to push the continuous flexible line out of the outlet of the nozzle; and a feed input mechanism, configured to actuate the motor when the feed input mechanism receives a single manual input from the single hand of the human user while the single hand of the human user holds and manipulates the housing; and a light source, supported by the housing, wherein the light source is configured to deliver a light beam to the continuous flexible line after the continuous flexible line exits the outlet of the nozzle to at least partially cure the photopolymer-resin component of the continuous flexible line; and wherein the feed input mechanism is further configured to selectively actuate the light source when the feed input mechanism receives the single manual input from the single hand of the human user while the single hand of the human user holds and manipulates the housing.

21. The system according to claim 20, wherein the feed input mechanism is further configured to selectively actuate the light source when the feed input mechanism receives a manual input from the single hand of the human user while the single hand of the human user holds and manipulates the housing.

22. The system according to claim 20, wherein the feed mechanism further comprises a feed adjustment mechanism, supported by the housing and configured to selectively adjust a rotational speed of the motor responsive to a manual input from the human user.

23. The system according to claim 20, further comprising a cutter, supported by the housing and configured to selectively cut the continuous flexible line adjacent to the nozzle, wherein the cutter comprises a cutter input mechanism, supported by the housing and configured to selectively cut the continuous flexible line responsive to a manual input from the single hand of the human user while the single hand of the human user holds and manipulates the housing.

24. The system according to claim 20, further comprising a skirt, extending from the housing adjacent to the nozzle, wherein the skirt is configured to impart a compaction force against the continuous flexible line after the continuous flexible line exits the outlet of the nozzle responsive to a force, applied by the single hand of the human user to the housing in the direction of the skirt.

25. The system according to claim 24, wherein the skirt extends only partially circumferentially around the nozzle.

26. The system according to claim 24, wherein the skirt comprises a viewing window, configured to provide a line of sight through the skirt to the nozzle.

27. The system according to claim 24, wherein:
the skirt comprises a rim; and
the rim is textured to impart a texture to the continuous flexible line responsive to the compaction force and to relative movement between the skirt and the continuous flexible line.

28. The system according to claim 24, wherein the skirt comprises a resilient material.

29. The system according to claim 20, wherein the outlet of the nozzle is configured to impart a texture to the continuous flexible line as the continuous flexible line exits the outlet of the nozzle.

30. The system according to claim 20, wherein the light source comprises a light-source input mechanism, supported by the housing and configured to selectively actuate the light beam responsive to a manual input from the single hand of the human user while the single hand of the human user holds and manipulates the housing to selectively and at least partially cure the photopolymer-resin component of the continuous flexible line.

31. The system according to claim 20, wherein the light source comprises a light frequency adjustment mechanism, supported by the housing and configured to selectively adjust a pulse frequency of the light source responsive to a manual input from the human user.

32. The system according to claim 20, wherein the light source comprises a light duration adjustment mechanism, supported by the housing and configured to selectively adjust a duration of the light source responsive to a manual input from the human user.

33. The system according to claim 20, further comprising one or more templates, configured to be placed against a surface, wherein each of the one or more templates comprises a boundary, configured to define the composite part when the continuous flexible line is dispensed from the nozzle within the boundary responsive to the human user holding and manipulating the housing with the single hand of the human user.

34. The system according to claim 33, wherein the one or more templates correspond to one or more unique parts to be manufactured by the system.

35. The system according to claim 20, wherein the feed input mechanism comprises a button extending through the housing.

* * * * *